W. L. GRAY & ORLANDO T. JOY.
Improvement in Ruffling Attachments for Sewing Machines.
No. 124,894. Patented March 26, 1872.
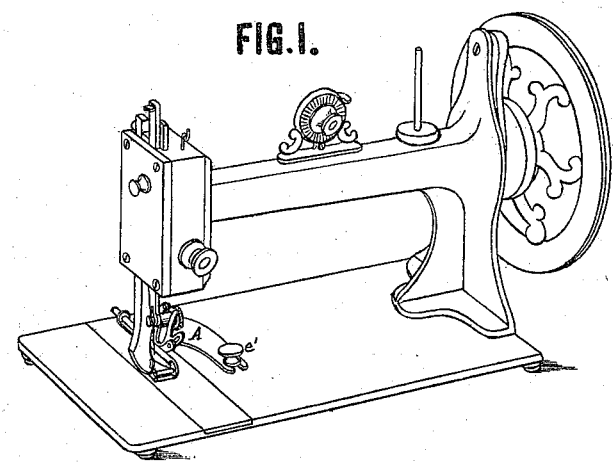
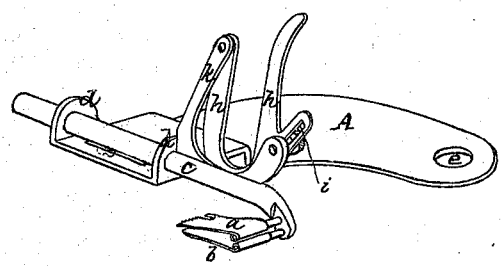
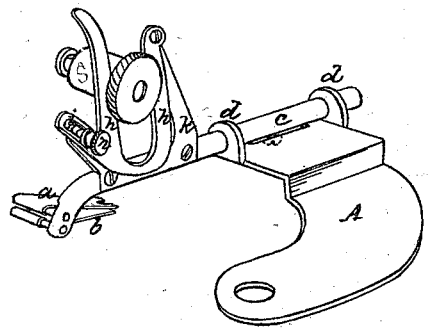
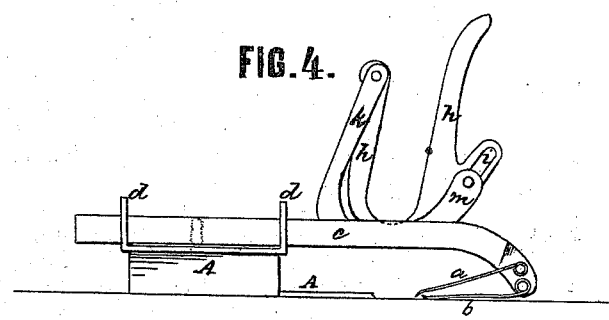

UNITED STATES PATENT OFFICE.

WILLIAM L. GRAY AND ORLANDO T. JOY, OF WATERTOWN, NEW YORK, ASSIGNORS TO DAVIS SEWING-MACHINE COMPANY, OF SAME PLACE.

IMPROVEMENT IN RUFFLING ATTACHMENTS FOR SEWING-MACHINES.

Specification forming part of Letters Patent No. 124,894, dated March 26, 1872.

*To whom it may concern:*

Be it known that we, WILLIAM L. GRAY and ORLANDO T. JOY, both of Watertown, in the county of Jefferson and State of New York, have invented certain new and useful Improvements in Gathering and Ruffling Attachments for Sewing-Machines, of which the following is a specification:

The nature of our invention consists in the combination, with the feeding devices of a gatherer or ruffler, of a U-shaped adjustable arm, constructed and operated substantially as hereinafter described, to regulate the length of gather and impart movement to the feeding devices.

In the accompanying drawing we have represented the manner in which our invention may be carried into effect.

Figure 1 represents the gathering and ruffling attachment in the position it occupies upon the cloth-plate of the sewing-machine. Fig. 2 is a perspective front view of the attachment. Fig. 3 is a like rear view of the same. Fig. 4 is a front elevation of the same.

The feeder of the gathering and ruffling attachment is composed of two metallic spring plates or jaws, $a\ b$, with the ends next to the needle converging, one or both of these ends being serrated or toothed, in order to take a surer hold on the cloth between them. The lower plate $b$ is preferably somewhat shorter than the upper one $a$, and the toothed ends of both plates, which exert a yielding pressure on the cloth, are beveled or equivalently formed, as shown in the drawing, so that when moving back preparatory to taking a fresh hold they will slip over the cloth and not drag the same with them. The front end of the feeder is notched to permit the passage of the needle.

In lieu of making both jaws springs or elastic, only one may be so made, the other being stiff or unyielding; but I prefer on many accounts the arrangement above described.

In order to impart a reciprocating motion to the feeder I attach the plates $a\ b$ to pins projecting from the side of a rod, $c$, capable of sliding back and forth in bearings $d$ formed on the supporting-plate A, this plate being provided with a hole or slot, $e$, through which passes the set-screw $e'$, which binds it to the cloth-plate of the sewing-machine, as shown in Fig. 1. The extent of movement of the feeder is limited by the cam $h$, one arm of which is pivoted to the top of a post, $k$, attached to or forming part of the rod $c$. The other half of the cam is provided with a slot, $i$, through which a set-screw, $n$, passes into a projecting piece, $m$, attached to or formed upon the rod $c$. The cam we make U-shaped, as shown in the drawing, the space between the two arms being of uniform width, so as to readily receive a pin or stud, $s$, on the needle-bar of the machine. We prefer to make this stud a roller-stud to avoid friction, and of such size as to fit snugly but not too tightly between the arms of the cam, thereby operating the same without noise. When the needle descends, the stud $s$ moves down between the arms of the cam and carries back the cam and the rod $c$, and consequently the feeder $a\ b$; as the needle-bar rises, the stud $s$ is carried up, and thus causes the forward or return movement of the feeder. The reciprocating movement of the feeder is thus made positive and uniform in both directions, and by loosening the set-screw $n$ and turning the cam in one direction or the other, the extent of movement of the rod $c$, and consequently the length of gather taken by the feeder, can be varied at pleasure.

A cam, such as described, may be used to good effect with feeding devices of other than the special construction hereinbefore set forth.

When the device is applied to a sewing-machine, as represented in Fig. 1, it will be seen that all of its parts, with the exception, perhaps, of the two spring feed-jaws which are opposite to the needle, are in rear of the presser-foot and needle, leaving the whole of the front of the machine unobstructed.

The machine represented in the drawing is a Davis sewing-machine, and the gatherer represented is constructed with special reference to its use with that machine. But it can be used with any other style of machine without change of principle, and by simply varying the manner of attaching it to suit the requirements of the particular machine for which it is intended.

A spring feeder of the construction above specified is adapted to gather one or more of several thicknesses of fabric, leaving the others ungathered. It will gather, for instance, the upper or lower piece or pieces, leaving the remainder smooth; or will gather one or more pieces in the middle, leaving untouched the pieces both above and below these middle pieces; or it will gather a single piece equally well. The piece or pieces to be gathered are, of course, inserted between the two jaws of the feeder.

In conclusion, we would state that we do not claim a spring-feeder composed of two converging jaws moving together, as above described; nor do we claim, broadly, combining with the feeder a cam for regulating the length of gather, actuated from the needle-bar, to give the feeder a positive back-and-forth movement.

Having now described our invention, and the manner in which the same is or may be carried into effect, what we claim, and desire to secure by Letters Patent, is—

The combination, with the spring-feeder and reciprocating rod, to which the same is attached, of the U-shaped cam and adjusting mechanism, substantially as described, through the medium of which a back-and-forth movement is imparted to the feeder, and the length of gather is regulated.

In testimony whereof we have signed our names to this specification before two subscribing witnesses.

WILLIAM L. GRAY.
ORLANDO T. JOY.

Witnesses:
ANSON E. YORK,
GEORGE N. SAGE.